(12) United States Patent
Harper

(10) Patent No.: US 8,000,457 B2
(45) Date of Patent: Aug. 16, 2011

(54) VISUAL ANSWERING MACHINE

(75) Inventor: Richard Harper, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1159 days.

(21) Appl. No.: 11/534,994

(22) Filed: Sep. 25, 2006

(65) Prior Publication Data

US 2008/0084970 A1 Apr. 10, 2008

(51) Int. Cl.
*H04M 11/00* (2006.01)

(52) U.S. Cl. .............. 379/100.01; 379/88.12; 379/88.23; 455/412.1; 455/567; 709/217

(58) Field of Classification Search ............. 379/100.01, 379/412.1, 67.1, 88.11, 88.23, 144.08; 340/7.43, 340/7.55; 348/14.01; 455/412.1, 412.2, 455/550.1, 567; 709/217
See application file for complete search history.

(56) References Cited

U.S. PATENT DOCUMENTS

| | | | |
|---|---|---|---|
| 6,323,754 B1 * | 11/2001 | Simons | 340/7.43 |
| 6,359,970 B1 | 3/2002 | Burgess | |
| 7,693,553 B2 * | 4/2010 | Moody et al. | 455/567 |
| 7,697,024 B2 * | 4/2010 | Currivan et al. | 348/14.01 |
| 2002/0112026 A1 * | 8/2002 | Fridman et al. | 709/217 |
| 2002/0142758 A1 * | 10/2002 | Abiko et al. | 455/412 |
| 2005/0020247 A1 * | 1/2005 | Lakkala | 455/412.2 |
| 2005/0031106 A1 | 2/2005 | Henderson | |
| 2007/0060193 A1 * | 3/2007 | Kim | 455/550.1 |
| 2007/0081643 A1 * | 4/2007 | Divine | 379/100.01 |

FOREIGN PATENT DOCUMENTS

| | | |
|---|---|---|
| EP | 1001588 A2 | 5/2000 |
| KR | 20040024786 A | 3/2004 |

OTHER PUBLICATIONS

"IVM Answering Attendant—ScreenShotS", retrieved on Sep. 25, 2006 at <<http://www.nch.com.au/ivm/screenshots.html>>, pp. 1-5.
PCT International Search Report dated Feb. 12, 2008 from corresponding PCT Application No. PCT/US2007/077534 filed Sep. 4, 2007, 4 pages.

* cited by examiner

*Primary Examiner* — Md S Elahee
(74) *Attorney, Agent, or Firm* — Lee & Hayes, PLLC

(57) ABSTRACT

An answering machine tool is described which, when a message is received, accesses caller identification data associated with the message and from this data identifies an image for the message. Data is then output to cause an icon comprising this image to be displayed. This icon, in turn, may be manipulated and interacted with by a user, by touching the icon on a touch sensitive screen or by other means, such as mouse pointer or stylus. This causes the message to be replayed, moved, deleted or be subject to any other course of action that the visual rendering of the message affords the user.

19 Claims, 8 Drawing Sheets

VISUAL ANSWERING MACHINE

BACKGROUND

Traditionally answering machines comprise units which can be connected to a telephone line and which include memory for storing audio messages. In many examples these units are integrated with a telephone or wireless telephone base station. Such units have typically had a small number of buttons which are used to control the device and a screen (e.g. an LCD screen or a seven-segment display) to indicate the number of messages received. The playback of messages may be triggered using the buttons on the unit, or messages may be played back remotely where playback is triggered by detection of tones produced by dialing a number sequence. Such machines play the messages in the order that they have been received (i.e. oldest message first) and the identity of the caller or the length of the message is not known until the message is played back.

More recently, network implemented answering machines have become popular. Here the audio messages (also referred to as voice messages or voicemail) are stored within the telephone network (e.g. by a network operator) or within an exchange (e.g. within a company or organization) and the messages are accessed using a short-code dialed from a user's telephone (e.g. by dialing 5000) or by pressing a dedicated key on the telephone. Control of the answering machine may be via an interactive voice response (IVR) system. Again messages are played back in the order that they have been received and the identity of the caller and length of message may not be known until the message is played back. In some examples, however, the telephone number of the caller may be identified prior to playback of a particular message (e.g. through an audible message saying "Message received from 01234-567891 at 10.35 am") or where the call is initiated within the same local exchange (i.e. within the same company), the caller may be identified (e.g. "Message received from John Smith at 10.57 am").

Computer based answering machines have also been developed. In some cases these are standalone applications which record the calls and provide a graphical user interface through which details of the calls are displayed or in other examples these provide a user interface to a network implemented answering machine (e.g. when implemented on an exchange within an enterprise). In all cases, the user interface provides an email inbox style view showing a list of calls received in the order that they were received and in some examples, details of the name/number of the caller and the length of the call may also be displayed.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An answering machine tool is described which, when a message is received, accesses caller identification data associated with the message and from this data identifies an image for the message. Data is then output to cause an icon comprising this image to be displayed. This icon, in turn, may be manipulated and interacted with by a user, by touching the icon on a touch sensitive screen or by other means, such as mouse pointer or stylus. This causes the message to be replayed, moved, deleted or be subject to any other course of action that the visual rendering of the message affords the user.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Whilst a user may receive a large number of emails each day, particularly in a business environment, the number of voice messages received is likely to be significantly fewer. As a result, using an email style user interface for an answering machine may not be an optimum approach. Even where a user receives many voice messages, an email style user interface may not be convenient because whilst a user can quickly assess the significance of an email from the subject field, this is not possible for voice messages.

Figure 1:
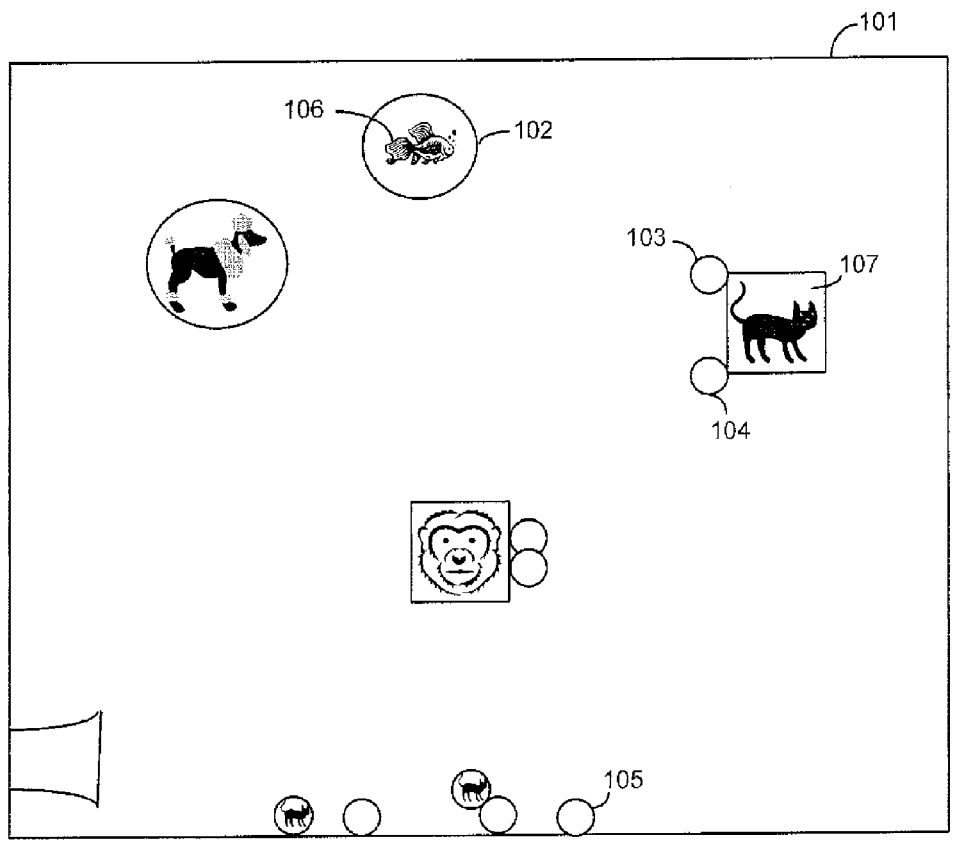
FIG. 1 is a diagram showing an example display screen for a visual answering machine.

FIG. 1 is a diagram showing an example display screen 101 for a visual answering machine. The display shows a number of icons, or 'bubbles' 102-105 each of which represents a voice message which has been received. Some of the bubbles contain an image 106 (e.g. bubble 102) or are linked to an image 107 (e.g. bubbles 103, 104) which is related to the message, such as a photograph of the caller. It will be appreciated that the diagrams in FIGS. 1 and 6-8 show simple graphical images instead of photographs for explanation purposes only. Where the caller is unknown, the bubble does not contain an image (e.g. bubble 105). Where more than one message has been received from a single caller, the bubbles may be clustered together or linked by the image (e.g. bubbles 103 and 104 are linked by a single image 107).

Such a display provides a user with a visual representation of the messages that have been received which can be easily understood and which can be viewed in a glance and/or at a distance. Furthermore, the display and corresponding user interface make it easier for a user to 'interact with' contents captured by an answering machine system. For example, messages received from the same caller can be grouped together. This can let a user easily determine whether someone has repeatedly tried to contact them often, and this may provide them with information even before they have listened to any of the messages; by showing no image (or alternatively a default image, such as an image of a silhouette) where the caller is unknown, the user can instantly identify those calls and can decide whether they wish to listen to the recorded messages provides another example; a user may select messages to be played back in an order which is independent of the order in which the messages were recorded a third. More instantiations may be imagined. As illustrated by these three examples, the representation of messages as visual objects or icons allows the user to make ad hoc judgments about appropriate courses of action with the messages themselves, choosing to deal with some 'now' and some later, and so forth. The flexibility of this interaction may be facilitated or augmented in a variety of ways, such as in the choice of visual object (size for example representing message size) or on location on a screen (uppermost indicating most recent, for example).

Figure 2:
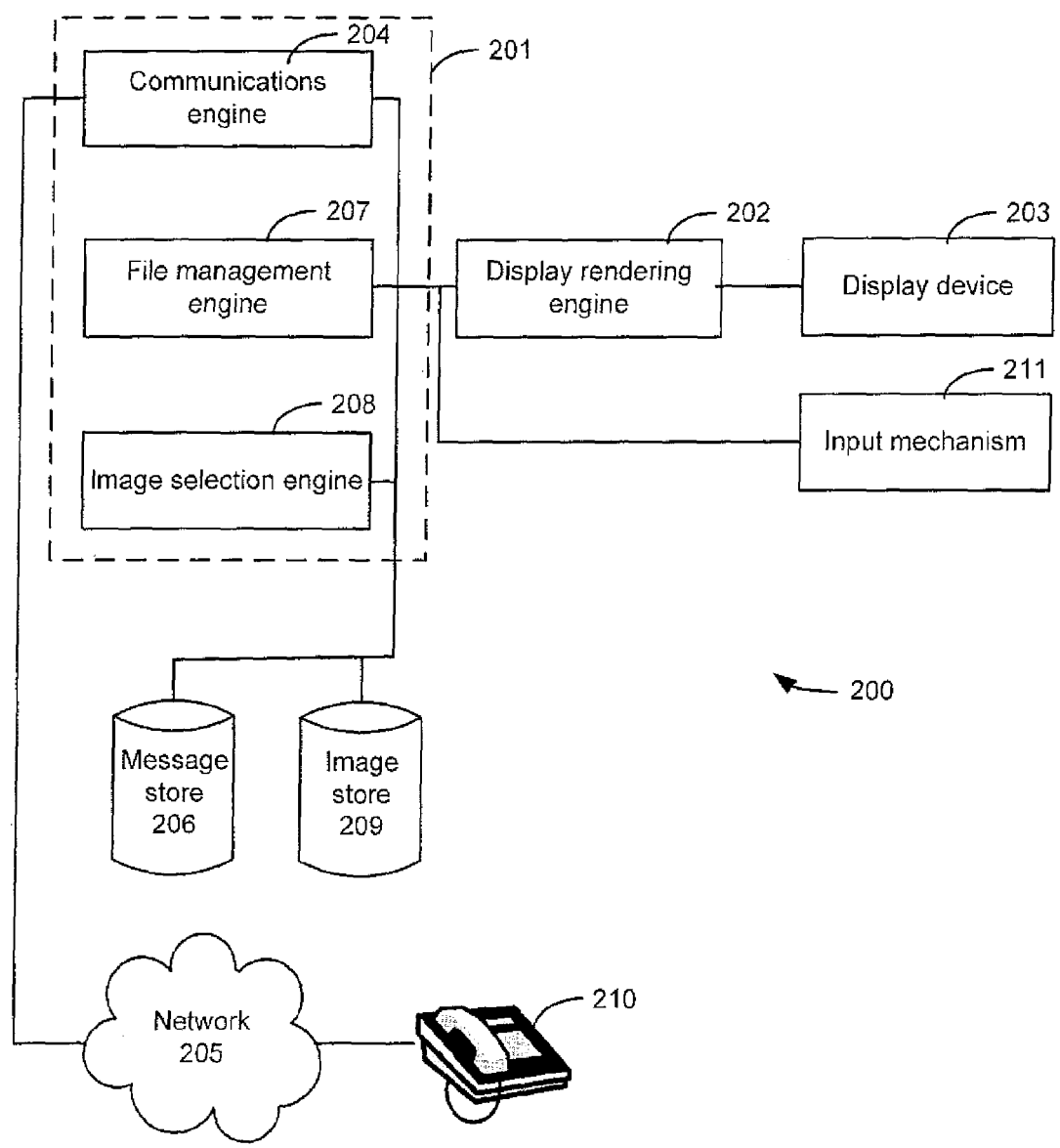
FIG. 2 is a schematic diagram of a system which includes a visual answering machine tool.

FIG. 2 is a schematic diagram of a system 200 which includes a visual answering machine tool 201. The visual answering machine tool 201 generates the data which can be output to a display rendering engine 202 to produce a display as shown in FIG. 1. The display rendering engine 202 has an output to a display device 203 which shows the display to the user. This display may also be associated with a method of user input 211 and so may, for example, comprise a touch screen (where the display device 203 and input mechanism 211 are integrated), an LCD screen with associated mouse and icon, a projector and camera (for input) or any other display and input device(s). The visual answering machine tool 201 comprises a communications engine 204 which is connected to a network 205 such that it can receive telephone calls or voice messages and which is arranged to convert voice messages into a format suitable for storage (e.g. in message store 206) and for playback, where required. The visual answering machine tool 201 also comprises a file management engine 207 and an image selection engine 208. The file management engine 207 is arranged to link the stored audio files (e.g. in message store 206) to images which are displayed and to cue the appropriate audio file in response to a trigger from the user. The user may touch the image or the bubble (where the display device comprises a touch screen) in order to trigger the playing of a message. The image selection engine 208 is arranged to provide a link between caller line identification (CLI) data and images. The images may be stored in an image store 209 or may be stored elsewhere (e.g. on the internet).

Figure 3:
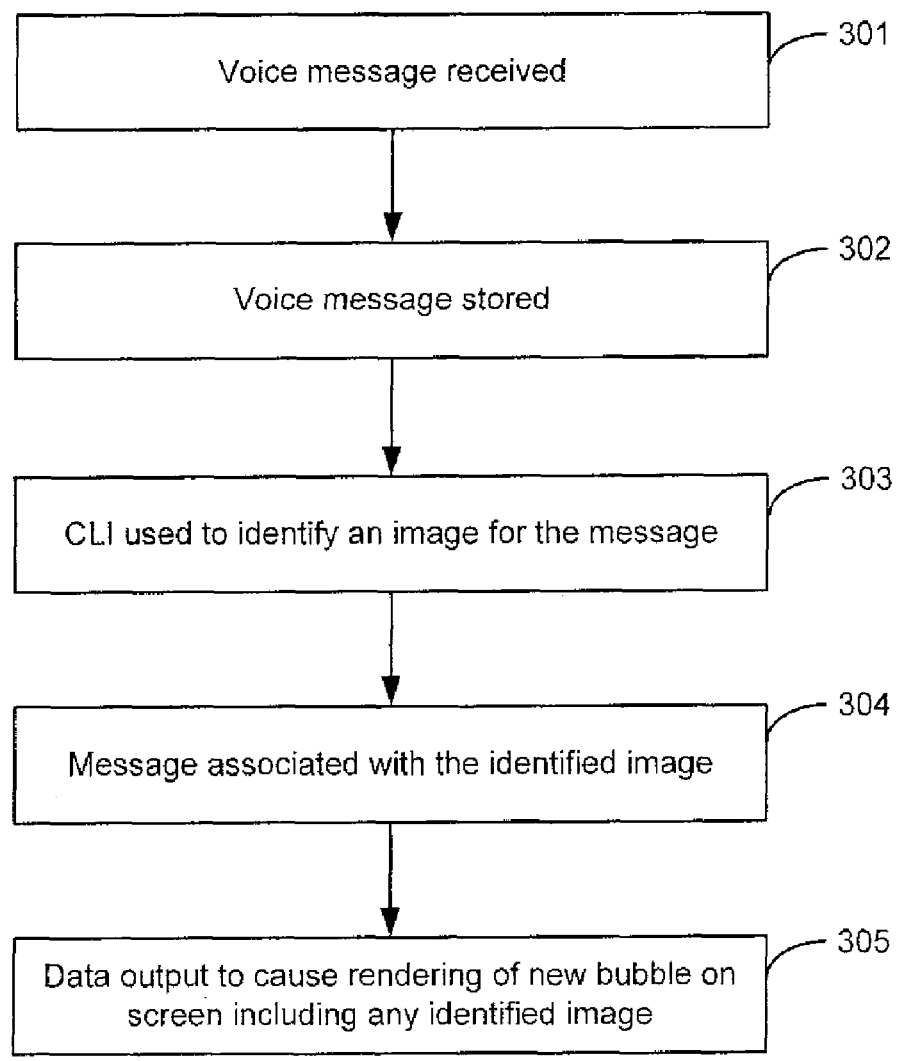
FIG. 3 shows an example flow diagram of a method of operation of a visual answering machine.

The operation of the visual answering machine tool 201 can be described with reference to the example flow diagram shown in FIG. 3. A voice message is received by the communications engine 204 (step 301) and the message is stored (step 302), for example in the message store 206. The storing process may require the message to be converted into a suitable format for storing and playback. The file management engine 207 accesses the CLI data associated with the message and interacts with the image selection engine 208 to identify any image linked to the particular CLI (step 303). Where no image is linked to the CLI or where the CLI data is missing (e.g. where it has been blocked by the caller) a default image may be identified or in another example, no image may be identified. The identified image (from step 303) is associated with the particular message by the file management engine (step 304) and data is output to cause the rendering of a new icon (e.g. bubble) on a display device, where the icon includes any identified image (step 305).

The message received (in step 301) may be recorded within the visual answering machine tool, (e.g. within the communications engine 204). For example, a voice call may be made from a telephone 210 to a user over a network 205 (e.g. a telephony network or data network, for example using Voice over IP technology) and the call may be terminated at the visual answering machine and the speech recorded as a data file (e.g. in WAV, MP3, WMP or any other suitable format). In another example, however, the message may be recorded elsewhere (e.g. at telephone 210 or elsewhere in the network 205) and the recorded file transmitted to the visual answering machine tool 201. The operation of the visual answering machine tool 201 does not depend on where the voice message is recorded.

As described above, the visual representation of a message provides information on the caller that recorded the message (i.e. by the image used or the absence of an identified image).

In addition to the visual answering machine tool 201 causing the linking of graphical representations to messages, the visual answering machine tool allows the user to manipulate (i.e. drag, press, delete, cluster, etc) the graphical representations in an ad hoc or improvised manner so as to satisfy their own user preferences for dealing with messages. Such manipulation may be permitted in all or part of the display window (e.g. just in the saved portion 605 of FIG. 6). For example, in the display screen shown in FIG. 7, two saved messages from the same person are represented by bubbles 703, 704. These may have been grouped together by a user with the appropriate input method (e.g. using a touch sensitive display where the display device is a touch sensitive display).

In addition to providing information on the caller that recorded the message (as described above), the visual representation of a message may be used to provide additional information about the message and/or its contents. In a first example, the size of the icon and/or associated image may be related to the length of the recorded message. Thus, long messages may be represented by larger icons and/or images whilst smaller messages may be represented by smaller icons and/or images. This may be particularly useful where a very short message is recorded (e.g. a few seconds of silence before the caller ends the call) because by representing them by small icons and/or images, a user may be able to immediately infer that there is no useful content in the message and therefore delete it without first listening to it. In another example, the size of the message may be related to the length of the speech within the message, with messages having no detectable speech (i.e. the disconnected calls as described above) being specifically identified or automatically deleted.

Figure 6:
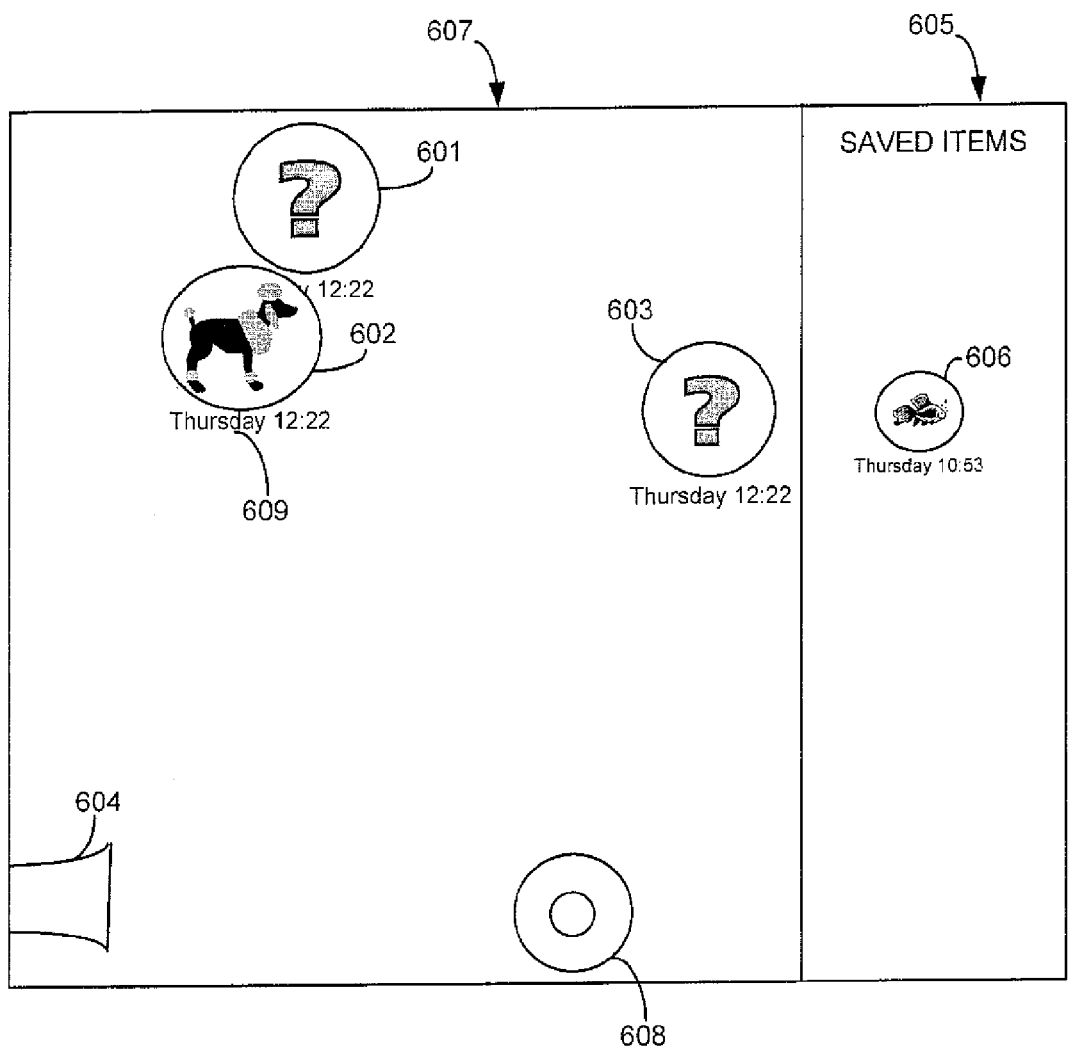
FIGS. 6-8 are diagrams showing examples of display screens for a visual answering machine.

In addition to the visual representation of a message providing the user with information about the message before the message is played back, the location of the visual representation within the overall display area may also provide information on the message (as alluded to with the clustering example described above) and this is described in more detail below. The image may also be accompanied by text providing additional information about the message, as shown in FIG. 6 and described below.

Figure 4:
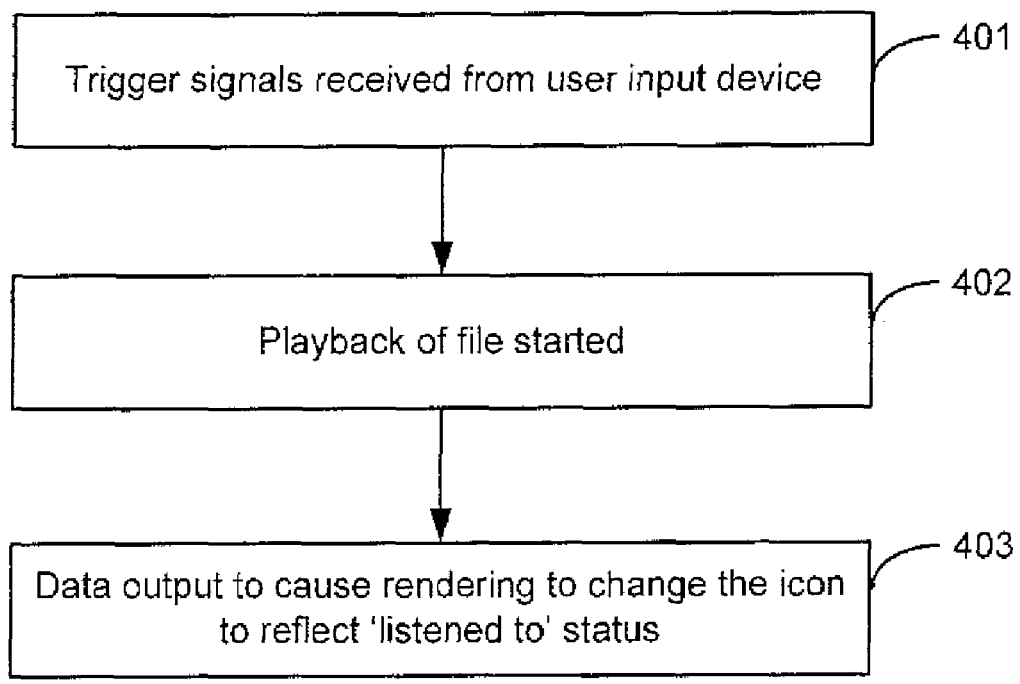
FIG. 4 shows a second example flow diagram of a method of operation of a visual answering machine.

The visual answering machine tool 201 plays back the message to the user in response to a trigger received from that user, as shown in FIG. 4. The file management engine 207 receives a trigger signal from a user input device 211 (step 401). The user input device may be integrated with the display device 203 where the display device is a touch sensitive screen. In other examples, the user input device may be a mouse, keyboard, motion detector etc. There are many different ways in which a user may initiate the trigger and a number of examples are described in more detail below. In response to receipt of the trigger signal (in step 401), the file management engine initiates the playback of the required audio file (step 402) and may also output data to the display rendering engine 202 to cause the display of the icon and/or image to change to reflect the change in status of the message (step 403), e.g. from 'new' to 'listened to'. In an example, the bubble and any associated image may change color, size or become more transparent once the message has been played back. In another example, the position of the bubble or image on the display may change to reflect the change in status of the message.

Figure 5:
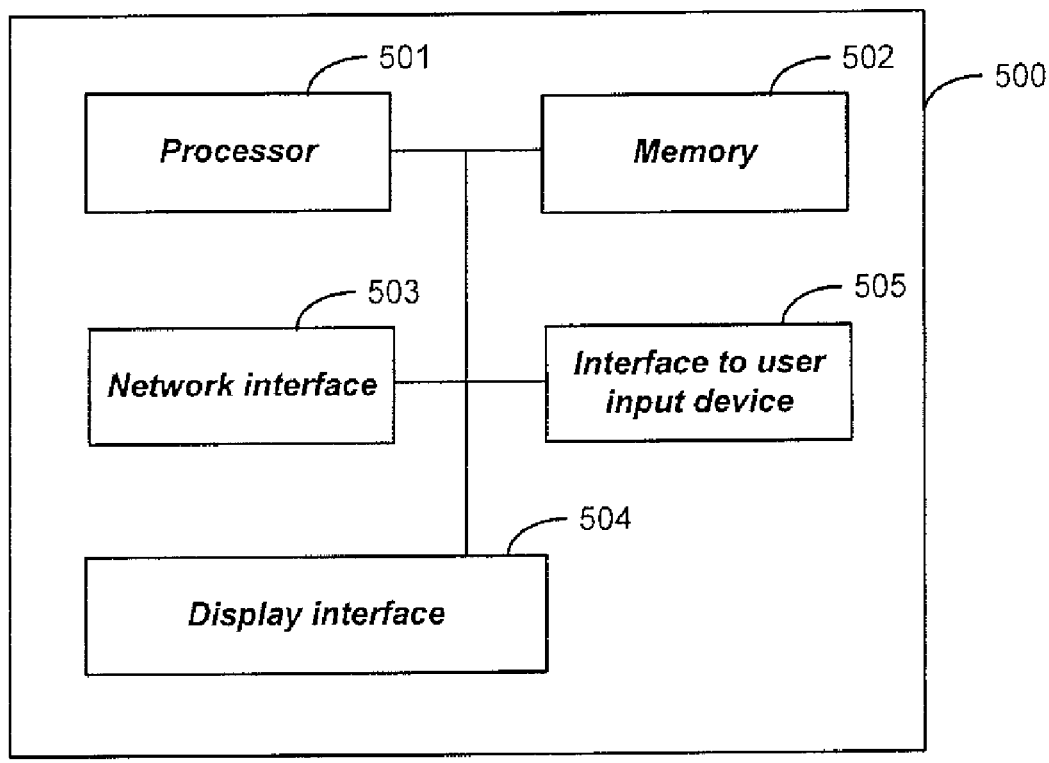
FIG. 5 shows a schematic diagram of a computer for implementation of a visual answering tool.

In an example, the visual answering machine tool 201, message store 206 and display rendering engine 202 may be implemented on a computer 500, as shown in FIG. 5. The computer 500 may comprise a processor 501 and a memory 502 arranged to store executable instructions arranged to cause the processor to perform one or more of the methods described herein. The memory 502 may further be arranged to store the audio files for received messages or alternatively a separate message store may be provided (not shown in FIG. 5) which may be within the computer 500 or separate from the computer but accessible from the computer (e.g. via network interface 503). The memory may also be arranged to store the image files associated with CLI data or alternatively the images may be stored elsewhere (e.g. in a separate image store or on the internet). Where the images and/or messages are located elsewhere, the memory 502 or other memory element within the computer 500 (not shown in FIG. 5) may be arranged to store location information for each message/image, such as a uri (uniform resource identifier) for each message/image. The computer may also comprise a network interface 503 for receiving voice messages and/or audio files, a display interface 504 for outputting data to a display device and an interface 505 to a user input device for receiving signals indicative of user inputs. The network interface 503 may also be arranged to receive telephone calls (e.g. from a telephone network or using VoIP), where the calls are terminated at the visual answering machine. The computer 500 may be integrated within a telephone handset, base station or other device or may comprise a PC.

In another example, the visual answering tool 201 may be implemented on a server within a communications network, such as a telephone network, the internet or a local area network. The data output (in step 305) may be to a web page which can be accessed remotely by a user. In another example, the data may be accessed by an application running on a remote device (e.g. located in the user's home or a portable device carried by a user) which renders the display on a display device. In such a networked implementation, the tool 201 may be used to receive messages for many users and the data displayed to each user may be limited to calls to a particular telephone number or extension. In other examples, a display may be provided showing messages for more than destination telephone number (e.g. for a group of users, such as all sales representatives).

In a further example, the visual answering tool 201 may be distributed across more than one computer or more than one network node. For example, the communication engine 204 may be located within the network, whilst the file management and image selection engines 207, 208 may be implemented on a device in the user's home and which is connected to a network such that it may communicate with the communication engine 204. In such an example, the communication engine 204 may store the voice messages on a message store 206 in the network or alternatively the messages may be stored in a message store which is located in a user's home (e.g. within the device on which the file management and image selection engines are implemented).

In another example, a voice message may be recorded on a web server and then transferred to another server (e.g. an ftp server). The communications engine, which may be implemented on a local web server, may then interact with this second server to access the messages. The file management engine, which may be implemented in flash, may interact with the communications engine and render the image on a local display.

As described above, the position of a visual representation of a message within the overall display area may be used to provide additional information to the viewer about a message. This additional information may include information regarding when a message was received, an importance level of a message, the status of a message, etc. In a first example, the position of a graphical representation of a message may indicate when the message was received, as shown in FIG. 6. FIG. 6 shows an example screen display in which when messages are initially received, the graphical representation of the message is displayed near the top of the screen, e.g. bubble 601. As the time since the message received increases, the position of the graphical representation of the message moves downwards on the display (e.g. as if the bubbles are sinking). When the bubbles reach the bottom of the display (or of a region of the display) they may stay at this position or they may be automatically deleted (e.g. calls with unknown CLI may be automatically deleted after 10 days unless saved). This means that a user can tell from looking at the display the approximate time since a message was received and also assess the relative age of messages e.g. the messages displayed as bubbles 602 and 603 were received at approximately the same time and after the message displayed as bubble 601. In the example of FIG. 6, when a new message is received a new bubble is displayed emerging from the tube 604 and floating to the top of the screen. It will be appreciated that this is just one way of displaying the age of a message. Other examples include displaying the graphical representations on a timeline (e.g. horizontally or vertically), having the bubbles move in a horizontal direction rather than a vertical direction (as shown in FIG. 6), using perspective (such that the representations of recently received messages appear closer than representations of older messages), displaying the bubbles on a clock face etc.

In addition to, or instead of using position to provide information on the time at which a message was received, the position of the image may be used to show the status of a message. For example, as shown in FIG. 6, a region 605 of the display area may be dedicated to showing the graphical representations of messages (e.g. bubble 606) which have been saved by a user. A user may cause a message to be saved by dragging the graphical representation of the message from the normal region 607 of the display into the region 605 dedicated to saved messages. Once placed in this region, a graphical representation may continue to move (e.g. with time, as described above) or the position of the graphical representation may remain the same until moved by the user. Similarly, a user may cause a message to be deleted by dragging the graphical representation of the message from the normal region 607 or the saved message region 605 onto a region 608 for deletion. In an example, the position of a graphical representation may also indicate whether a message has been listened to, with different screen regions for new messages and messages that have been listened to (not shown in FIG. 6).

Figure 7:
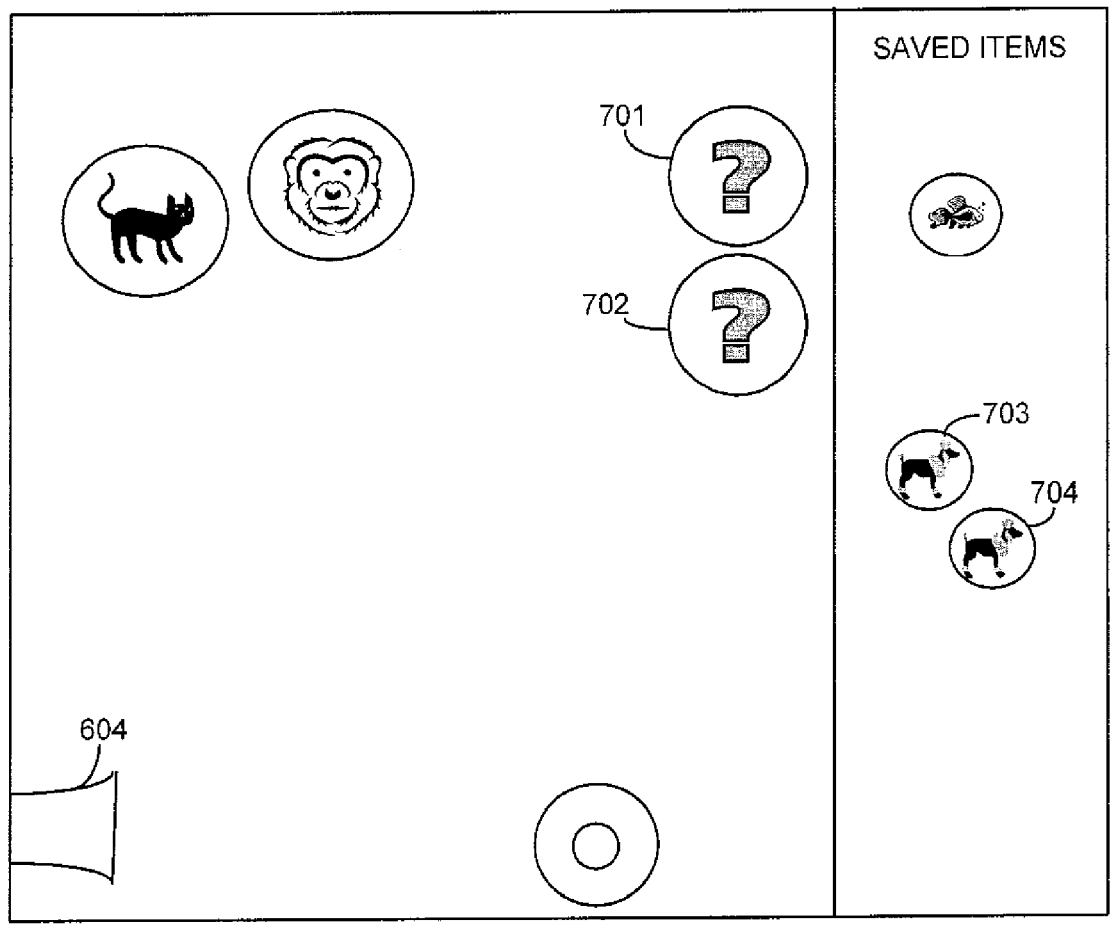
Figure 8:
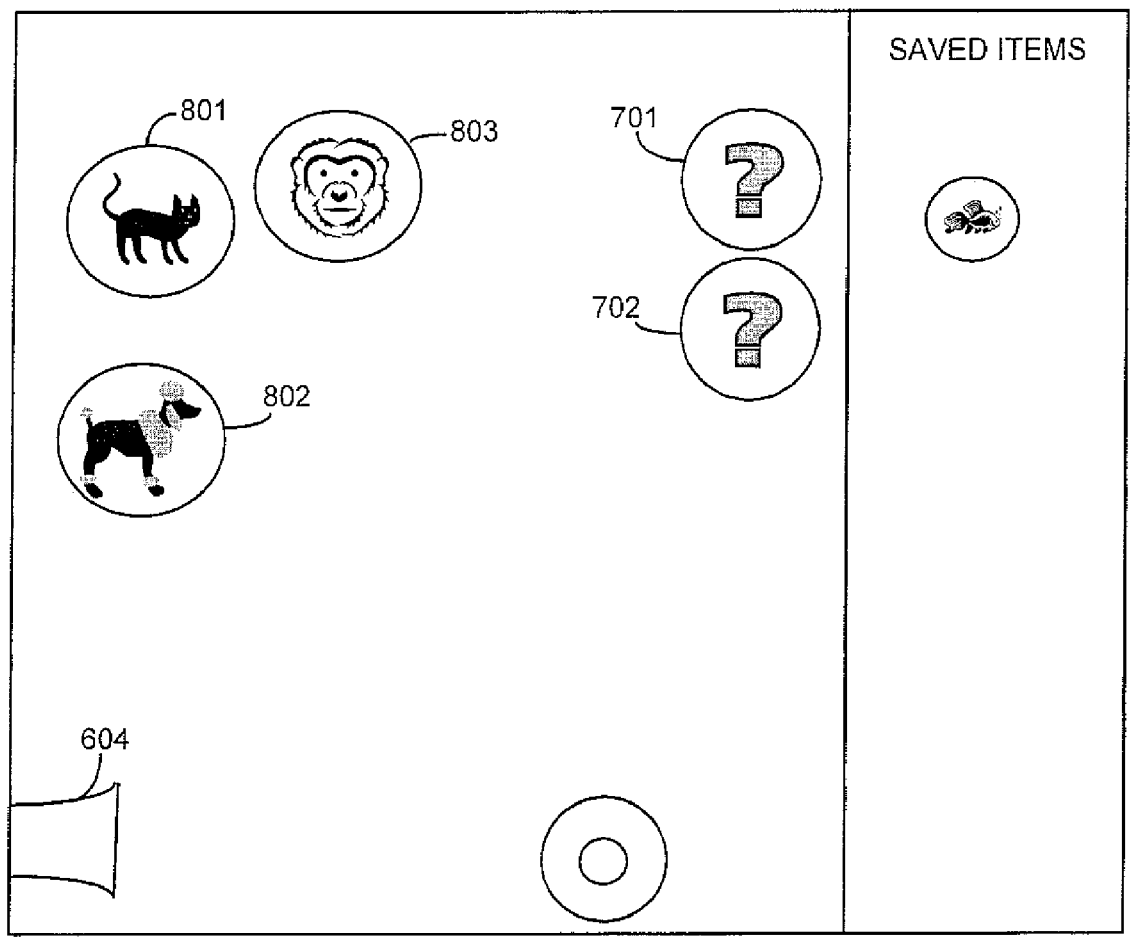

Messages may also be grouped on the display according to the CLI. For example, as shown in FIG. 1, representations of messages which are from the same person may be linked together (e.g. bubbles 103 and 104 linked by image 107) or may be clustered together, as shown in FIG. 7, where two graphical representations 701, 702 for messages from unknown callers are shown in the same vertical line, whilst graphical representations for messages from other callers are shown in different vertical lines. Furthermore, two saved messages from the same caller are displayed with their bubbles 703, 704 being arranged in a cluster. Where a user has set up a group structure for known callers (as described below), graphical representations of messages received from any members of a group may be displayed in a cluster or in the same vertical line. For example, as shown in FIG. 8, bubbles 801 and 802 may represent messages from members of the user's family and are shown in the same vertical line, whilst bubble 803 may represent a message from a work colleague and may therefore be displayed in a separate vertical line.

In addition to representing messages by images, the images may be accompanied by small amounts of text which provide additional information about the message. For example, as shown in FIG. 6, an image may have an associated line of text 609 detailing the day and time that the call was received. In other examples the text might include the name of the caller, the number of the caller, the length of the message, the status of the caller (e.g. online, busy, away as used in instant messaging applications) or any other information relating to the message or the caller. Where the visual answering machine includes a speech to text engine (not shown in FIG. 2) the text may include the first few words of the message.

There are many different ways in which a user may initiate the trigger for playback of a voice message. Examples include touching the graphical representation with a finger (where the display is touch sensitive), a cursor (e.g. as controlled by a mouse or trackball) or a stylus (e.g. where the display is a tablet PC, PDA or other device with a stylus). The operation may require a single touch or a double touch (e.g. a double mouse click). In an example, the display may be projected onto a surface, such as a table, a wall, the floor etc and the position of the user or a part of the user (e.g. their finger, hand or foot) may be detected to provide a user input, such that a user may trigger playback of a message by touching (or stepping on, waving in front of, hovering over etc) the appropriate graphical representation. In another example, a user may initiate the playback of a message by dragging the graphical representation to a particular region of the display, in a manner analogous to that described above to trigger the saving or deleting of a message.

In addition to interacting with the visual answering machine tool to cause messages to be played back, a user may also interact for other reasons, including changing the status of a message, saving or deleting messages (e.g. as described above), sorting messages, returning calls and configuring user-specific aspects. In an example, once a message has been listened to, a user may be able to touch the graphical representation to cause a return call to the caller to be initiated (e.g. single touch to play, double touch to return call).

A user may interact with the image selection engine 208 in order to associate images with CLI data. The images may be photographs of the caller or any other image and the images may be stored anywhere and may be referenced by file name, file location, uri or any other suitable reference. Images may be captured using a camera (which may be part of the system) and uploaded to the visual answering machine tool. A user may interact with the visual answering machine tool to identify groups of callers, e.g. 'family', 'friends', 'work' etc. The image selection engine may use a contacts, address book or telephone directory style interface to enable a user to add an image to CLI data and to assign a group to a potential caller.

In another example, the caller may identify the image that is to be associated with their CLI data in a visual answering machine tool display for the called party. This image information may be sent by the caller at the same time as the message (e.g. the image file or a reference to the image) or may be stored at an accessible location within a network (e.g. on a server) which is accessed by the image selection engine.

There are many different display devices 203 on which the display may be rendered by the display rendering engine 202. Examples include:

a touch sensitive screen hung on the wall (e.g. like a picture)
a touch sensitive screen on an appliance
a display screen of a computer
a projector, for example projecting on an appliance, wall, table or other surface The display device may, in some examples, be dedicated for displaying the graphics generated by the visual answering machine tool. In other examples, however, the display may comprise one possible display on a display device, for example as a screen saver, a web page, a selectable view etc. The display device may be combined with an input mechanism, such as afforded by a touch sensitive screen (as described above).

In addition to (or instead of) being used to represent messages received from remote callers, the visual answering machine tool may be used to display messages recorded locally, e.g. voice notes, reminders etc. A user recording a message locally may be required to identify themselves in order that an image may be selected as there is no CLI data. Alternatively a default image may be used to identify locally recorded messages (e.g. a picture of the registered user, a picture of the user's home etc). In another example, any other suitable means may be used to identify the individual recording the message, for example, through detection of a signal, such as a Bluetooth signal from a mobile telephone or PDA or a signal from an RFID or through entry of a username. In another example, the user may be required to connect a device (such as a mobile telephone) to the visual answering machine to identify the user. In a further example, a user interface may be provided for recording of the local message which includes icons/buttons for each registered user. The user recording the message may click/touch the required icon/button to identify the user.

Although the above description relates to display of voice messages, the visual answering machine tool and methods described herein may alternatively, or in addition, be used to provide a graphical representation of other forms of messages e.g. SMS (short message service) messages, video messages, email messages etc. Where the messages are in text form, the messages may be played back (in step 402) by displaying the text of the message or alternatively the messages may be converted to audio messages (e.g. on receipt or immediately prior to playback) and played back audibly. The user interface, coupled with the conversion of text based messages to audio messages provides an interface which enables visually impaired users to receive text based messages. Whilst a visually impaired user may not be able to read text, they may be able to recognize simple images or photographs used as graphical representations of messages.

Whilst FIGS. 1 and 6-8 show messages represented in the form of bubbles, this is by way of example only and it will be appreciated that any other form of graphical representation using images may be used. For example, images alone may be used or images inside boxes etc. The form of graphical representation used may be user or system configurable.

Although the present examples are described and illustrated herein as being implemented in a system as shown in FIGS. 2 and 5, the system described is provided as an example and not a limitation. As those skilled in the art will appreciate, the present examples are suitable for application in a variety of different types of networks and computing devices.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate. The examples and the combinations of examples described herein are provided by way of example only and any of the examples may be combined with any other of the examples in any manner.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. An answering machine tool comprising:
    a communications engine arranged to receive and store a plurality of messages from one or more callers; and
    a file management engine arranged to:
        access caller identification data associated with each of the plurality of messages,
        link a graphical image to the caller identification data associated with each of the plurality of messages,
        combine the graphical image with a graphical representation of each message of the plurality of messages, and
        output data to cause rendering of said graphical image and the graphical representation of each message of the plurality of messages on a display concurrently, for each of the one or more callers, the graphical representation of each message having a user-configurable shape,
        wherein graphical representations of messages received from a single caller, and wherein the graphical representation of a message is automatically deleted when the graphical representation of the message is displayed at a predetermined portion of the display and after a preset time since the message is received, unless the message has been saved are rendered on the display joined to a graphical image representing the single caller.

2. The answering machine tool according to claim 1, wherein each of the plurality of messages is a voice message.

3. The answering machine tool according to claim 1, wherein said file management engine is further arranged to:
    identify a default image where no image is associated with said caller identification data.

4. The answering machine tool according to claim 1, wherein said file management engine is further arranged to:
    identify a default image where no caller identification data is associated with said message.

5. The answering machine tool according to claim 1, wherein said file management engine is further arranged to:
    receive an input from a user indicative of a dragging operation on said graphical representation from a first region of the display to a second region of the display; and
    in response to receipt of said input, change a status of said message.

6. The answering machine tool according to claim 1, further comprising:
    an image selection engine arranged to associate caller identification data and images.

7. A method comprising:
    in response to receipt of a message from a caller, accessing caller identification data associated with said message;
    identifying a graphical image associated with said caller identification data and said message;
    linking the graphical image to the message; and
    outputting data to cause rendering of an icon having a user-configurable shape, comprising said graphical image on a display, the rendering being time-dependent, wherein the graphical image is rendered at a first portion of the display when the message is received and the graphical image is rendered progressively closer to a second portion of the display as time since the message was received increases and wherein the graphical image is automatically deleted when the graphical image reaches the second portion of the display and the message has not been saved.

8. The method according to claim 7, wherein said message is a voice message.

9. The method according to claim 7, wherein identifying a graphical image associated with said caller identification data comprises:
   identifying a graphical image associated with said caller identification data; and
   where no image is associated with said caller identification data, identifying a default image.

10. The method according to claim 9, wherein the identifying a graphical image associated with said caller identification data further comprises:
   where no caller identification data is associated with said message, identifying a default image.

11. The method according to claim 7, further comprising:
   receiving an input from a user indicative of a dragging operation on said icon; and
   in response to receipt of said input, changing a status of said message.

12. The method according to claim 11, further comprising:
   outputting data to cause rendering of a modified icon comprising said graphical image on said display.

13. The method according to claim 7, said icon having a size dependent upon a size of said message.

14. The method according to claim 7, further comprising:
   in response to receipt of an input from a user, initiating playback of said message.

15. The method according to claim 7, further comprising:
   outputting data to cause rendering of a modified icon comprising said graphical image on said display, said modified icon indicating a change in status of said message.

16. One or more machine-readable storage media with machine-executable instructions for performing acts comprising:
   in response to receipt of a message from a caller, accessing caller identification data associated with said message;
   identifying a graphical image associated with said caller identification data and said message;
   linking the graphical image to the message; and
   outputting data to cause rendering of an icon having a user-configurable shape, comprising said graphical image on a display, the rendering being dependent on a length of the message,
   wherein the graphical image is rendered on the display smaller in size than another graphical image when the length of the message is shorter than the length of another message associated with the other graphical image and the graphical image is rendered larger in size than the other graphical image when the length of the message is longer than the length of the other message associated with the other graphical image, and wherein the graphical image is automatically deleted when the graphical image is displayed at a predetermined portion of the display and after a preset time since the message is received from the caller, unless the message has been saved.

17. The one or more machine-readable storage media according to claim 16, wherein said message is a voice message.

18. The one or more machine-readable storage media according to claim 16, further comprising machine-executable instructions for performing acts comprising:
   receiving an input from a user indicative of a dragging operation on said icon; and
   in response to receipt of said input, changing a status of said message.

19. The one or more machine-readable storage media according to claim 16, wherein the graphical image is rendered on the display in a size that is dependent on a length of speech within the message.

* * * * *